United States Patent
Virginio

[19]

[11] Patent Number: 5,971,743
[45] Date of Patent: Oct. 26, 1999

[54] APPARATUS FOR MOLDING AND/OR DIE-CASTING PLASTICS, RUBBER AND THERMOSETTING MATERIALS HAVING DOUBLE TOGGLE JOINTS FOR THE CLOSURE OF DIES

[75] Inventor: Antonio Virginio, Arzignano, Italy

[73] Assignee: Nuovo Plastic Metal s.r.l., Chiampo, Italy

[21] Appl. No.: 09/006,020

[22] Filed: Jan. 12, 1998

[30] Foreign Application Priority Data

Jan. 21, 1997 [IT] Italy .................................. VI97A0009

[51] Int. Cl.$^6$ .................................................. B29C 45/64
[52] U.S. Cl. ...................... 425/593; 100/286; 425/451.6
[58] Field of Search ..................... 425/592, 593, 425/451.5, 451.6; 100/281, 283, 285, 286

[56] References Cited

U.S. PATENT DOCUMENTS

| | | | |
|---|---|---|---|
| 2,744,304 | 5/1956 | Kaul | 425/593 |
| 2,792,592 | 5/1957 | McGee | 425/593 |
| 5,252,286 | 10/1993 | Bugatti | 425/593 |
| 5,603,969 | 2/1997 | Guindani et al. | 425/593 |

*Primary Examiner*—James P. Mackey
*Attorney, Agent, or Firm*—Bucknam and Archer

[57] ABSTRACT

The device for the closure of dies is provided with a system of levers (10), (11), (17) and (18) forming a double toggle joint each with seven pivot points and a mobile intermediate plate (14). The device permits a substantial increase in the course of the mobile plate while maintaining unchanged the connections of the connecting rods and permits achievement of a greater length of the useful course of the mobile plate while maintaining parity with the prior art in the space occupied by the course, also a reduction of the thrust forces to which the components of the device are subjected as well as a lower production cost under equal production conditions.

3 Claims, 4 Drawing Sheets

APPARATUS FOR MOLDING AND/OR DIE-CASTING PLASTICS, RUBBER AND THERMOSETTING MATERIALS HAVING DOUBLE TOGGLE JOINTS FOR THE CLOSURE OF DIES

FIELD OF THE INVENTION

The present invention relates to a device for closing the dies in an apparatus for molding plastics, rubber and thermosetting materials and also in apparatus for die-casting processes, in which the control mechanism is based on a double toggle joint, with substantial advantages with respect to the prior art, both with respect to the space occupied by the apparatus under parity of the course of the movable plate and also from the point of view of the reduction of the stress to which the components of the toggle joint are subjected as well as all the other parts of the apparatus and finally the overall cost of the apparatus for the purpose of increasing the course of the mobile plane.

BACKGROUND OF THE PRIOR ART

Injection apparatus in use at present comprise a mechanism for closing and opening the die which is usually defined as a double toggle joint. In fact, in general they comprise four horizontal columns which are placed above a bed and which are positioned on the vertexes of a quadrilateral, being fixed by means of mechanical blocks which are called column nuts, the entire complex being mounted on a fixed plane usually called a lathe bed. A movable plate on which is fixed the moving part of the die, slides on the columns. This movable plate is connected by means of lever devices to the head of the die, which in its turn slides on the lathe bed, but with the possibility of being fixed to the columns due to the displacement of the column nuts, to the most convenient position on the basis of the dimensions of the objects to be manufactured by means of the apparatus.

In an apparatus as described hereinabove, the closing and opening movement of the movable plate which carries the die with respect to the fixed plate which carries the dolly is obtained by means of a complex of connecting rods and pins, usually called a double toggle joint, the motion being actuated by means of a hydraulic cylinder usually located on the die head. The action of this hydraulic cylinder, the piston of which is connected with the spider which slides on a column called a spider column, allows to obtain by means of the motion of the connecting rods, the extension and the regrouping and therefore the closure and the opening of the movable plate which carries the die. The number of gudgeon pins which connect the components of the connecting rods defines the structure, generally called toggle joints having five pivot points. It is clear that in a mechanism operating as described the course of the opening of the movable plate remains always conditioned particularly on the length of the connecting rod of rotation, because the mechanism must close on itself and the length cannot be greater than the limit of interference with the corresponding connecting rod of the opposite side. In view of the foregoing, any improvement in the extent of the course of the movable plate can only be obtained by increasing towards the exterior the length of the connecting rod of rotation and which connects the mechanism with a plate, the latter sliding on the lathe bed and being called the die head. These increases in the extent of the course therefore can only be obtained by increasing towards the exterior the length of the connecting rod of rotation, a fact which involves in general an increase in the dimension of the die head, with substantial increase in the cost of manufacture, in the occupied space, and above all creating flexure conditions which are frequently not acceptable because the applied forces are not aligned with the axis of the columns.

SUMMARY OF THE INVENTION

An object of the present invention is to provide an apparatus which permits achievement of a substantial increase in the course of the movable plate while keeping unchanged the hook-ups or connections of the connecting rods. This increase is obtained by inserting pairs of connecting rods suitably shaped and provided with three articulated joints, in which the intermediate joints are pivoted in brackets integral with an intermediate plate, the latter plate being movable along the columns, this plate acting only as a guide, while the extremity points are connected on one side with the toggle joint, the latter being connected by means of other connecting rods to the hydraulic cylinder and to the die head while the other extremities of the connecting rods are connected by means of another pair of connecting rods to the movable plate which carries the movable die.

The novelty of the present invention therefore resides in the use of a toggle joint having seven pivot points which causes well defined advantages both with respect to a substantial greater length of the useful course of the movable plate while maintaining parity in the space being occupied by the course, also in a reduction of the stresses involved to which the components of the apparatus are subjected and finally all the moving parts of the apparatus, and in addition a very important advantage from the point of view of the cost of the apparatus at the same production level.

BRIEF DESCRIPTION OF THE DRAWINGS

The invention will be illustrated in more detail by reference to the accompanying drawings in which

As shown in FIGS. 1 and 2, the apparatus comprises lathe bed (1) on which is mounted the fixed vertical plate (2). The columns (3) are mounted on the vertical plate (2) and are fixed by means of the fixed column nuts (4) while at the opposite end there are disposed the movable column nuts (5).

Figure 1:
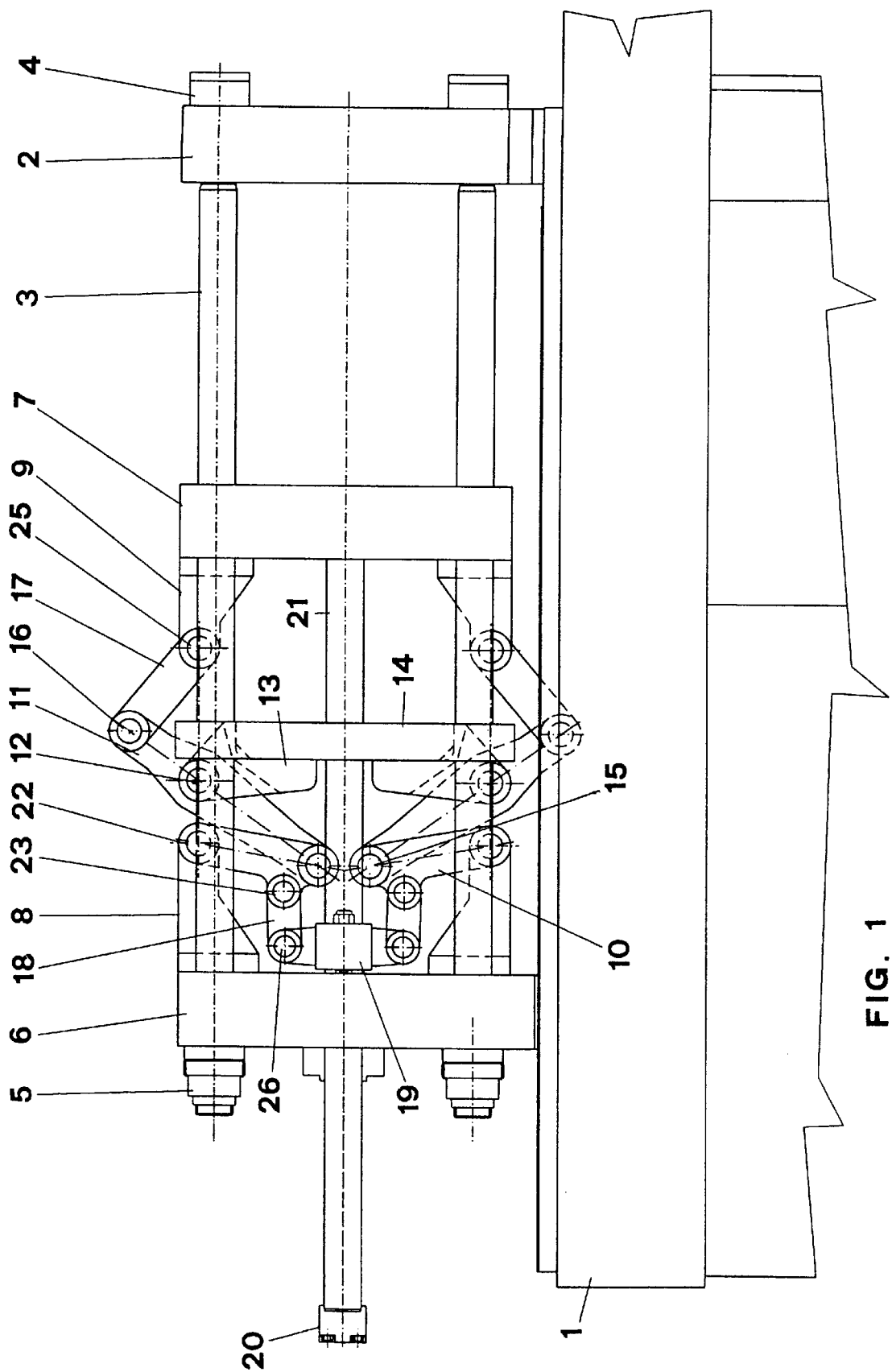
FIG. 1 is a front elevational view of an apparatus according to the invention in the position of maximum opening of the dies.

On the columns (3) are mounted the head plate (6) and the movable plate (7), both provided with supports (8) and (9), respectively. To the extremities of supports (8) are pivotally connected rotating connecting rods (10). Connecting rods (10) are pivotally connected to intermediate connecting rods (11) which handle the pushing or thrust motion. The rods (11) are pivoted by means of intermediate pins (12) to the brackets (13) which are integral with the movable intermediate plate (14), the latter being clearly shown in FIG. 5.

Figure 2:
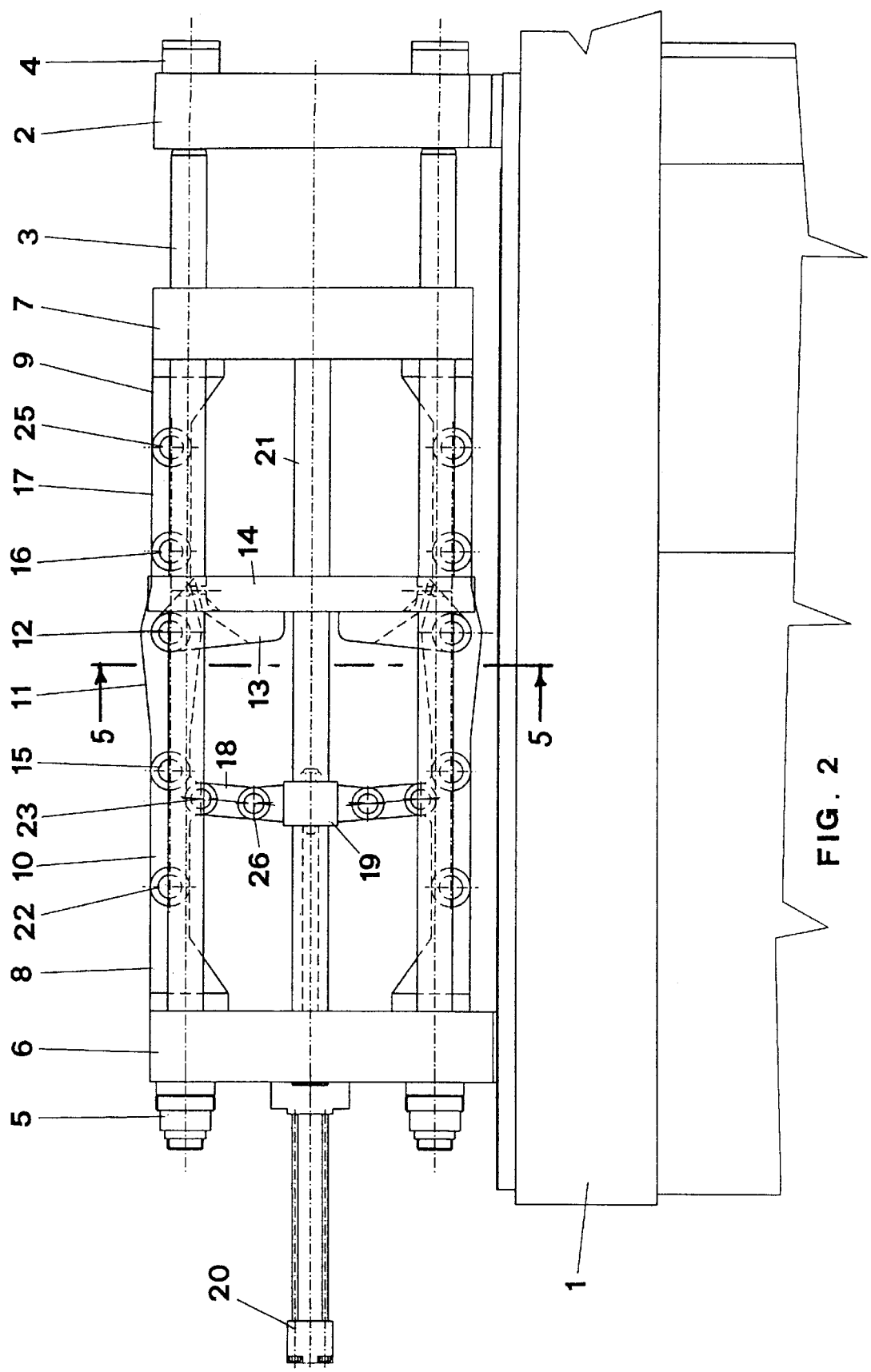
FIG. 2 is a front elevational view of the apparatus shown in FIG. 1 in the position of maximum closure of the dies.
Figure 3:
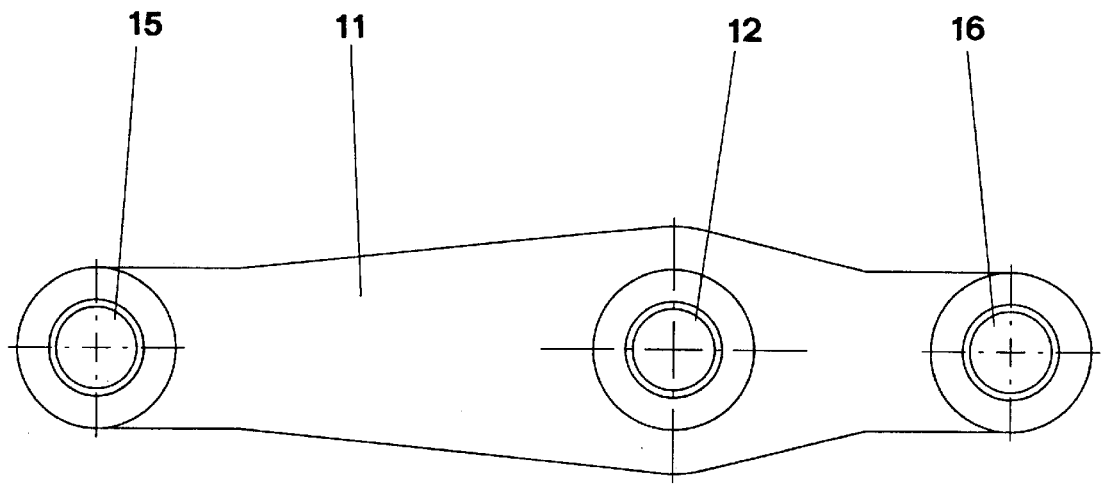
FIG. 3 is a front elevational view of the intermediate connecting rod.
Figure 4:
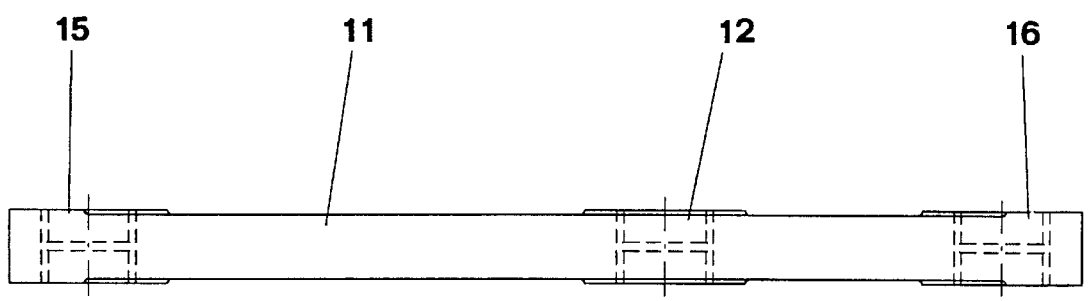
FIG. 4 is a side view of the intermediate connecting rod shown in FIG. 3.
Figure 5:
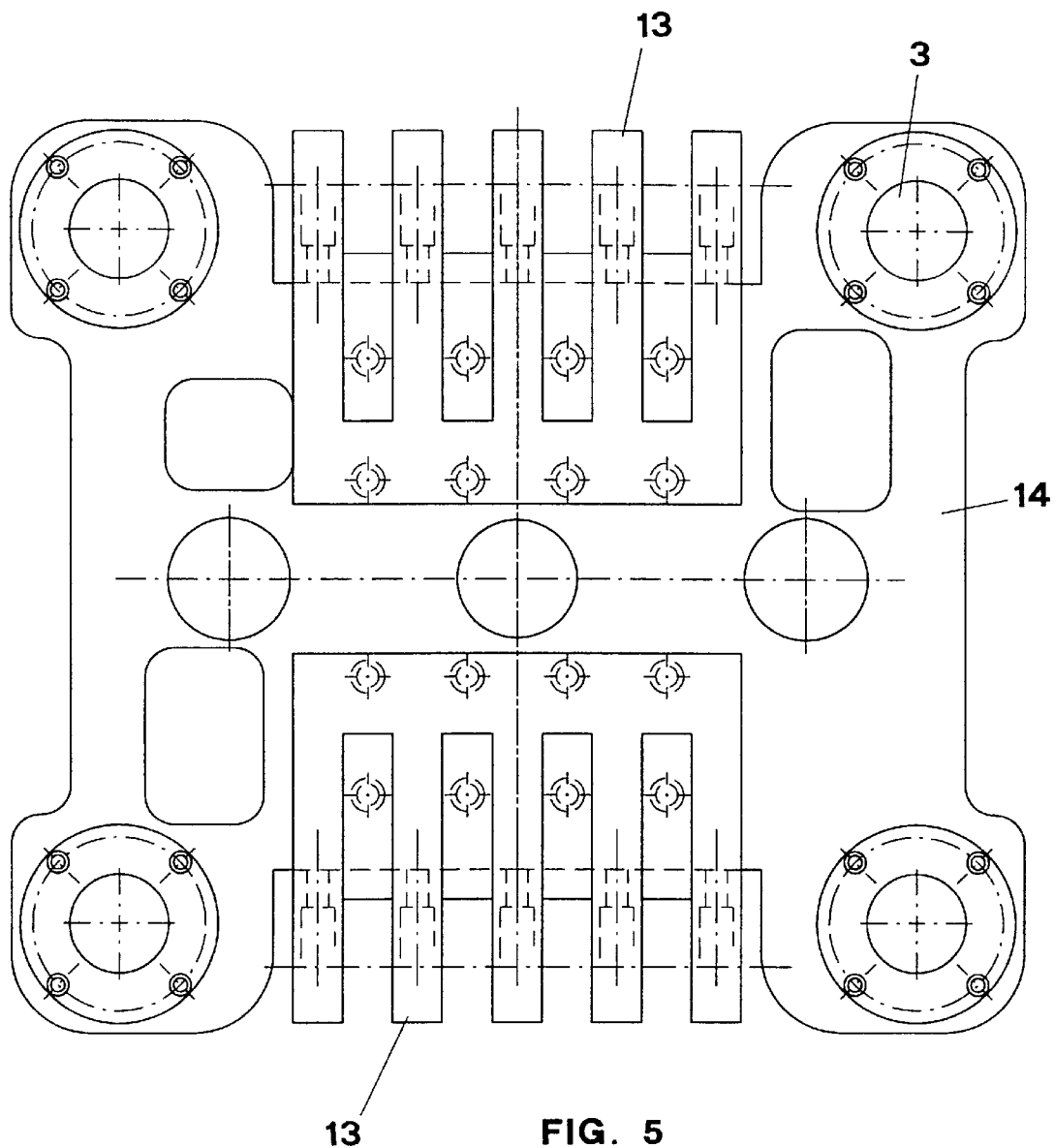
FIG. 5 is a view taken along 5—5 of FIG. 2 showing a front view of the intermediate movable plate of the apparatus of the present invention.

FIG. 5 shows that the brackets (13) are disposed on both sides of the intermediate movable plate (14) and form cavities which can be in the number of four or also a different number for the plate (14). The intermediate connecting rods (11) rotate within the plate (14) but obviously are not shown in FIG. 5. Each intermediate connecting rod (11), as clearly seen in FIGS. 3 and 4, is formed with a central fulcrum within which the pin (12) is seated and two lateral fulcrums (15) and (16). As clearly seen in FIGS. 1 and 2, the two lateral fulcrums (15) and (16) are connected respectively to the rotation connecting rod (10) on one side and to the thrust connecting rod (17) on the other side. The connecting rod (10) is connected by means of the rod (18) to spider (19). Spider (19) slides on the spider column (21) which is integrally connected to the movable plate (7) and slideable within the die head (6). The shaft of the hydraulic cylinder (20) is connected to the spider (19).

It should be noted that for each thrust mechanism there are provided seven fulcrum points as follows: fulcrum points (15), (12) and (16) which are provided on the intermediate thrust connecting rod (11), fulcrums (22) and (23) which are provided on the rotation connecting rod (10), fulcrum (26) provided on the spider rod (18) and fulcrum (25) provided on the thrust connecting rod (17). These are the seven articulated joints of the toggle joint which constitute the main novel feature of the present invention.

On the basis of what has been described hereinabove, which essentially constitutes the functioning mechanism of the apparatus, the advantages according to the present invention are clearly evident because they are based on the toggle joint having seven points of articulation and because of the greater length of the useful course of the movable plate (7) with respect to the fixed plate (2) as well as a reduction in the thrust or pushing forces to which levers (18), (10), (11) and (17) are subjected.

While maintaining the same essential features mentioned hereinabove, it will obviously be possible to construct apparatus with dimensions substantially different therefrom and still obtain in each case the advantages discussed hereinabove. Naturally, the particular constructive details of the apparatus described and illustrated in the attached drawings may assume different shapes and different appearance while the essential characteristics of the invention will remain the same without departing from the scope of the present invention.

What is claimed is:

1. An apparatus for molding and die-casting plastics, rubber and thermosetting materials having double toggle joints for the closure of dies, said apparatus comprising
   a) a bed (1);
   b) a fixed plate (2) holding a fixed die and mounted on said bed (1);
   c) four horizontal columns (3) carried by said fixed plate (2), said columns (3) being fixed at first ends thereof to said fixed plate (2) by column nuts (4) and having movable column nuts (5) at the free ends thereof;
   d) a die head (6) movably mounted on said four columns (3) to be position registrable on said bed (1) and having a die head support (8) thereon, said movable column nuts (5) providing a stop for said die head (6) on said columns (3);
   e) a movable plate (7) holding a movable die thereon and being movably mounted on said four columns (3), said movable plate (7) having a movable plate support (9) thereon;
   f) a hydraulic cylinder (20) having a shaft;
   g) a spider (19) fixedly mounted on said cylinder shaft; and
   h) a group of four connecting rods (10, 11, 17, 18) pivoted on seven intermediate points (12, 15, 16, 22, 23, 25, 26) connecting the die head support (8) and the movable plate support (9) and the spider (19), whereby the extent of the course of the movable plate (7) is thereby increased.

2. The apparatus as defined in claim 1, which further comprises an intermediate movable plate (14) disposed intermediate said die head (6) and said movable plate (7), said intermediate movable plate (14) having a bracket (13) thereon, and wherein said group of four connecting rods (10, 11, 17, 18) pivoted on seven intermediate points (12, 15, 16, 22, 23, 25, 26) comprises:
   a) a rotation connecting rod (10) pivotally connected at a first end (22) to said die head support (8);
   b) a connecting rod (18) pivotally connected at a first end (26) to said spider (19) and at a second end (23) to said rotation connecting rod (10);
   c) an intermediate connecting rod (11) pivotally connected at a first end (15) to a second end of said rotation connecting rod (10) and pivotally connected at an intermediate point (12) to said bracket (13) of said intermediate movable plate (14); and
   d) a thrust connecting rod (17) pivotally connected at a first end (16) to a second end of said intermediate connecting rod (11) and at a second end (25) to said movable plate support (9).

3. The apparatus as defined in claim 2, wherein said intermediate movable plate (14) is movably mounted on said four horizontal columns (3), whereby maximum extension of said movable plate (7) and maximum reduction of the thrust forces on said rotation connecting rod (10), intermediate connecting rod (11) and thrust connecting rod (17) are obtained.

* * * * *